United States Patent [19]

Stiles

[11] Patent Number: 5,373,660

[45] Date of Patent: Dec. 20, 1994

[54] TRELLIS SUPPORT SYSTEM

[75] Inventor: Herbert D. Stiles, Blackstone, Va.

[73] Assignees: Virginia Tech Intellectual Properties, Inc.; Virginia Polytechnic Institute & State University, both of Blacksburg, Va.

[21] Appl. No.: 73,445

[22] Filed: Jun. 8, 1993

[51] Int. Cl.⁵ ............................................. A01G 17/06
[52] U.S. Cl. ........................................................ 47/46
[58] Field of Search ........................ 47/46 R; 248/153

[56] References Cited

U.S. PATENT DOCUMENTS

| | | | |
|---|---|---|---|
| 319,674 | 6/1885 | Claus | 47/46 R |
| 941,894 | 11/1909 | Stetson | 47/46 R |
| 4,536,989 | 8/1985 | Caywood et al. | 47/46 R |
| 4,787,585 | 11/1988 | Tedham et al. | 248/153 |

FOREIGN PATENT DOCUMENTS

| | | | |
|---|---|---|---|
| 0477969 | 5/1975 | Australia | 47/46 R |
| 0495041 | 6/1976 | Australia | 47/46 R |
| 842718 | 6/1939 | France | 47/46 R |
| 0852253 | 8/1981 | U.S.S.R. | 47/46 R |
| 0858658 | 8/1981 | U.S.S.R. | 47/46 R |

OTHER PUBLICATIONS

"A Cheap Trellis", May 17, 1988 American Grange Bulletin.

Primary Examiner—Ramon S. Britts
Assistant Examiner—Joanne C. Downs
Attorney, Agent, or Firm—Whitham, Curtis, Whitham & McGinn

[57] ABSTRACT

A trellis system which can be used with raspberry and other fruit production includes a plurality of structural units (36) which are essentially two dimensional in shape to allow for flat packing and shipping. Trellis wires (34) are strung over a plurality of structural units (36) positioned in a trellis row and are subsequently anchored (34) to the ground at each end of the trellis row. The structural units (36) are positioned directly on the ground surface at any location desired by the user and do not need to be staked in the ground. In one embodiment, the structural units are a rigid one piece construction (10, 12, 14, or 16). In another embodiment, the structural units are made on site by connecting to essentially identical linear pieces (52 or 60) together. A wire loop connector (42 or 44) allows for quick and effective connection of a wire (46) once the structural units are positioned.

5 Claims, 2 Drawing Sheets

TRELLIS SUPPORT SYSTEM

BACKGROUND OF THE INVENTION

1. Field of the Invention

The invention is generally related to a trellis support system used for crop production that can be easily and quickly assembled for use in a field, and that can be easily and quickly collapsed for shipping, handling and storage. The invention has particular application to raspberry production, but can be modified for other crops.

2. Description of the Prior Art

Standard trellis systems for raspberries and other fruit crops utilize a plurality of posts with a plurality of wire trellising lines connected to the posts. The plants are trained to the wires of the trellis system. Erecting the trellis system typically involves the use of equipment such as a post hole digger or post driver. Trellising large fields involves considerable man-hours, and, in addition, removing the trellis system for mechanized pruning or other purposes involves considerable man-hours. Besides being labor intensive, installing the posts may result in soil-compaction which will be adverse to the growth of the plants if tractor mounted augers or other equipment is used. Furthermore, installation of the posts cannot proceed when the ground is frozen or too wet for manually operated or tractor mounted equipment.

Darrow, G. M., 1917, Figure 16, "A wooden support used in raspberry fields . . . ", p. 23, in *Raspberry Culture, USDA Farmers Bulletin* 887, Washington, D.C., shows a wooden support structure for trellising raspberries; however, the wooden support structure cannot be collapsed for shipping, handling, or storage. In addition, Darrow does not disclose a quick and effective wire attachment mechanism.

Pritts. M., 1989, FIG. 13, "Temporary T trellis for primocane-fruiting raspberries", p. 42, in *Bramble Production Guide*, NRAES-35, ed. M. Pritts and D. Handley, Ithaca, N. Y., shows a trellising system that allows for movement of a trellis post; however, the installation of the trellis system is more costly and time consuming than standard trellises.

Otten, P. M. and T. M. Schuett, 1991, "The econotrellis for primocane raspberries", *Northland Berry News*, 5(1): 1–4, discloses a trellis system that requires installation to a depth of 15" to 30" in the soil. Hence, the low-cost of the trellis system is offset by the added time and difficulty of installation. Furthermore, the Otten trellis system must be extracted from the soil and be removed from the site before mechanized pruning of the raspberry canes can be undertaken.

SUMMARY OF THE INVENTION

It is an object of this invention to provide a trellis system which can be installed on-site quickly and easily without the use of a post hole digger or post driver, and which can be quickly and easily collapsed for storage, as well as for shipping and handling purposes.

According to the invention, a trellis system includes a plurality of support units each of which includes a ground engaging end and a wire engaging end. The support units are positionable at any desired location. The ground engaging end is set directly on the ground surface and does not need to be staked into the ground. The wire engaging end allows for holding two spaced apart wire lines at a position elevated above the ground surface. The wire lines are draped over the wire engaging ends of a plurality of the support units and are preferably held in wire attachment connectors positioned at opposite sides of the wire engaging ends. The wires are anchored into the ground at their ends which maintains the support units in an upright configuration for trellising the plants to the trellis wires. The support units should be flat for shipping and storage purposes.

One embodiment of the support units includes a rigid, two dimensional, structure wherein the wire attachment connectors are fixedly spaced apart and the ground is engaged over the width of the support unit. Another embodiment of the support units includes two identical, substantially linear pieces which can be connected together to create an "X" shaped configuration at the time of installation of the trellis system, but which can be very compactly stored as linear pieces during shipping, handling or storage of the trellis system. One design for connecting the linear pieces includes providing an interlocking loop along the length of the linear piece which interlocks with an identical loop on a second linear piece. Another design for connecting the linear pieces includes providing a hinge pin to connect the two linear pieces and a support bar to hold the two linear pieces in an "X" shaped configuration.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1A:
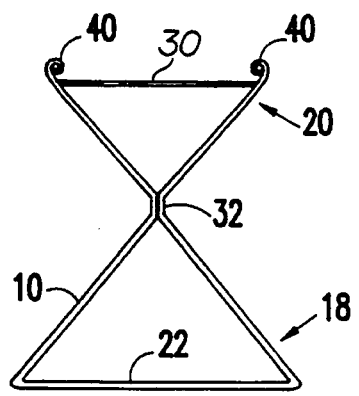
FIGS. 1a–d are plan views of alternative configurations of a rigid trellis support unit used in the trellis; system of this invention.
Figure 1B:
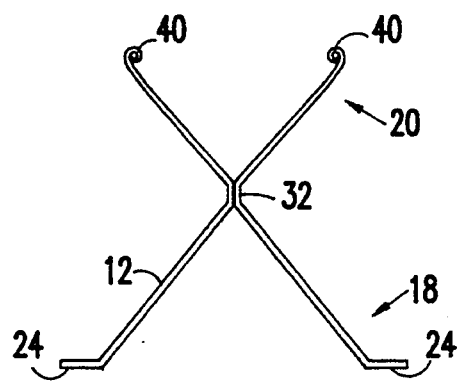
Figure 1C:
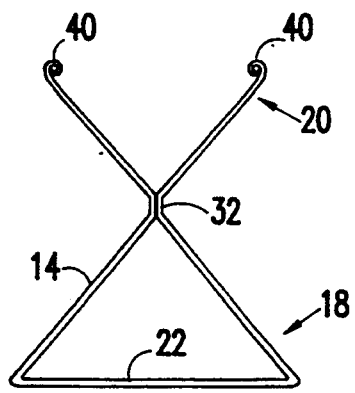
Figure 1D:
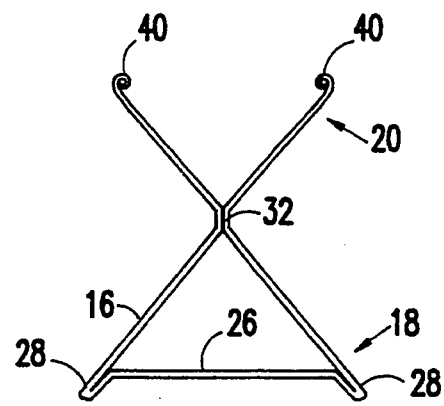

Referring now to the drawings, and more particularly to FIGS. 1a–d, there are shown alternative configurations of rigid support units 10, 12, 14, and 16. Each of the rigid support units 10, 12, 14, and 16 is essentially a flat, two dimensional structure which includes a ground engaging end 18 and a wire engaging end 20. The ground engaging end 18 is placed directly on the ground surface, and does not need to be staked into the ground. Because the ground engaging end 18 rests on the ground surface it can be set up and taken down very quickly; thereby, avoiding the labor intensive job of digging post holes for conventional trellis systems and avoiding the adverse effects of ground compaction that results when tractor mounted post hole digging equipment is utilized. In addition, having the ground engaging end 18 rest on the ground surface allows the trellis system to be set up under adverse conditions, such as when the ground is frozen or when the ground is very soggy. The ground engaging end 18 can be a connector bar 22 such as that shown in FIGS. 1a and 1c which will span across the ground surface; however, simple feet 24, such as shown in FIG. 1b, may also be used. The ground engaging end 18 shown in FIG. 1d is advantageous because it includes both a connector bar 26 that provides the structural unit with strength and projection points 28 that can dig into the ground once the trellis system is installed.

The trellis system will include a plurality of identical support units, such as the rigid support units shown in FIGS. 1a–d. However, it may be advantageous to use a rigid support unit such as shown in FIG. 1a which has an additional strength adding connector bar 30 as the end supports in the trellis system since they will be under the greatest amount of stress. The rigid support units 10, 12, 14, and 16 should be made of metal, metal alloys, or man-made polymeric materials which will withstand use in the field. The materials chosen should be strong enough to support a plurality of plants in the trellis system. The rigid support units shown in FIGS. 1a–d show side members welded or glued together at the diagonal site 32 to provide the support units with rigidity in the two dimensional plane defined by the structural unit 10, 12, 14, or 16.

The rigid support units could be provided in other configurations to those shown in FIGS. 1a–d. A particular advantage of the rigid support units is that they are substantially two-dimensional and can be stored and shipped with each of the plurality of structural units flatly packed on top of one another.

Figure 2:
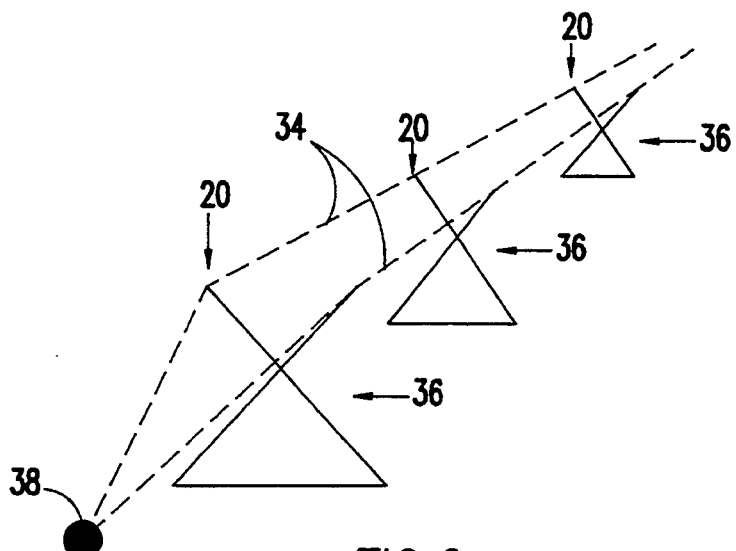
FIG. 2 is an isometric view of the trellis support system of this invention with trellis wires attached to the wire engaging ends of a plurality of the trellis support units.

FIG. 2 shows the general configuration of the trellis system of this invention wherein a pair of wires or a single loop of wire 34 is held above the ground at the wire engaging ends 20 of a plurality of spaced apart structural units 36. The wires or loop of wire 34 are strung over the wire engaging ends 20 of each structural unit and is securely connected to the ground using an anchor 38 at each end of the row of structural units 36. Hence, only two anchors 38 need to be provided for each trellis system to be installed, as opposed to the requirement in conventional trellis system(s) of digging a plurality of post holes to support the trellis system.

In operation, the user positions each of the plurality of structural units 36 at a desired location, then connects the wires or loop of wire 34 to both sides of the wire engaging end of each structural unit, and then connects the wires or loop of wire 34 to the ground using anchor 38. The trellis system has the advantage that the structural units can be easily taken down and repositioned if desired and do not need to be placed at positions a fixed distance apart. In addition, the trellis system of this invention can be easily adapted for use on existing plants simply by erecting structural units of the trellis system on opposite sides of the plant. The trellis system is erected such that the plants are positioned between the wires 34 and grow up between and are trained to the wires 34. In the case of raspberry production, the canes of the plant project through the space between the wires 34 and drape over the wires; thereby, facilitating harvesting operations.

In addition to training plants such as raspberries, the trellis system can be used for other purposes. For example, after the trellis system is erected, plastic films, spunbonded row covers, and the like can be draped over the wires to protect plants from spring frost injury. Using a frost cover over the trellis system can prolong the Growing season by allowing earlier Growth and harvesting to be obtained. In addition, netting can be draped over the trellis system for protecting the plants from pests such as squirrels, rabbits, and the like which are known to eat the fruit of crops such as strawberries and raspberries. The netting may also reduce flying insects from damaging the plants and thereby reduce the need for using dangerous pesticides. Furthermore, the trellis system could also be used to quickly erect a temporary fence or barrier.

FIGS. 1a–d show that each rigid support unit 10, 12, 14, or 16 is provided with wire attachment connectors 40.

Figure 3A:
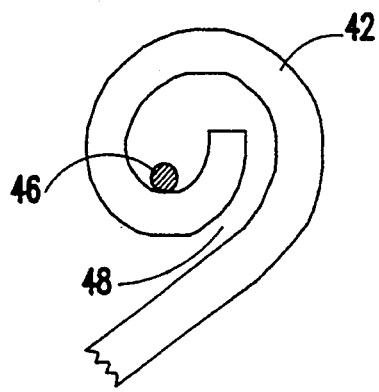
FIGS. 3a and 3b are enlarged plan views of wire attachment connectors which can be used on the trellis support units of the present invention.
Figure 3B:
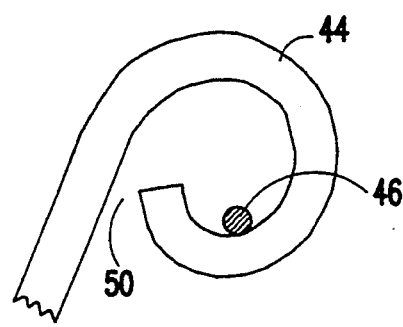

FIGS. 3a and 3b show particularly preferred wire attachment connectors 42 and 44, respectively. FIG. 3a shows a wire loop which would be used where the wire connector 42 is oriented toward the inside of the trellis, while FIG. 3b shows a wire loop which would be used where the wire connector 44 is oriented toward the outside the trellis. The important feature of both connectors is that the wire 46 can be slid through a slot 48 or 50 and then be firmly supported within a semicircular trough without disengaging from the structural units. Referring to FIGS. 2 and FIGS. 3a and 3b, it can be seen that the structural units 36 can first be positioned as desired and then wire 34 for each side of the trellis system can be inserted into the wire loop 42 or 44. If an eye hole were used for connecting the wires, each structural unit would need to first be strung on the wire prior to their being positioned.

Figures 4A, 4B:
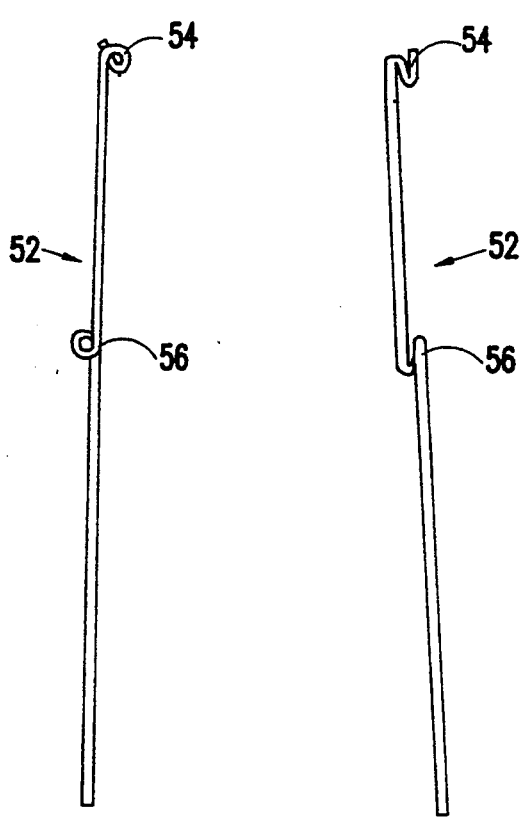
FIGS. 4a and 4b show plan and side views of a linear piece which can be used as both the left and right sides of a trellis system.
Figure 5:
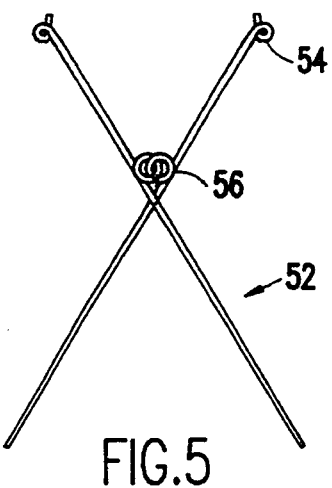
FIG. 5 is a plan view of the linear units of FIGS. 4a and 4b connected together and oriented in an "X" configuration.

FIGS. 4a, 4b, and 5 show an alternative embodiment of the invention wherein the structural units can be assembled from two identical linear pieces 52. Each linear piece 52 includes a loop wire engaging end 54 and a centrally located loop 56. As shown in FIG. 5, the centrally located loop 56 of each linear piece 52 can be slid together with and interlocked with the loop 56 of a second linear piece 52. The centrally located loops 56 allow the linear pieces 52 to be pivoted relative to one another at the loop 56 site so that an "X" shaped configuration of a single structural unit can be made. After the "X" shaped configuration is formed, wires are passed through the wire engaging ends 54 to create the trellis system. Some particular advantages of the structural unit embodiment of FIGS. 4a, 4b, and 5 are that only a single shaped unit needs to be fabricated during manufacturing of the trellis system, and the use of linear pieces 52 allows for very compact storage of the trellis system.

Figure 6:
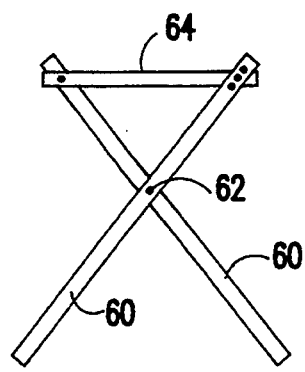
FIG. 6 is a plan view of an alternate structural unit.

FIG. 6 shows an alternate embodiment of the invention wherein the structural unit is assembled from two identical, linear shaped pieces 60 that are connected by a hinge pin 62, and a support bar 64. The support bar 64 can pivot on a pin inserted at one end of one linear shaped pieces and lock onto a pin on the opposite linear shaped piece 60. Other means for connecting the support bar 64 can be utilized. Each structural unit would be assembled and the wires of the trellis system would be draped over the support bar 64. The embodiment of FIG. 6 offers similar compact storage advantages to the configuration shown in FIGS. 4a, 4b, and 5.

While the invention has been described in terms of its preferred embodiments, those skilled in the art will recognize that the invention can be practiced with modification within the spirit and scope of the appended claims.

Having thus described my invention, what I claim as new and desire to secure by Letters Patent is as follows:

1. A trellis system, comprising:
    a plurality of structural units each of which has a ground engaging end and a wire engaging end, said ground engaging end includes a means for resting said ground engaging end on a surface of the ground, said wire engaging end includes a means for holding two wire lines in a spaced apart configuration, each of said structural units being essentially two-dimensional in shape;
    wire, having first and second ends, positioned to pass through said means for holding two wire lines in a spaced apart configuration; and
    anchors connected to said first and second ends for connecting said wire to the ground, said wire performing both the function of providing trellising between said structural units and the function of holding said structural units on said surface of said ground.

2. The trellis system of claim 1 wherein said means for holding two wire lines in a spaced apart configuration includes two separated, two-dimensional, loop connectors in the same plane of said structural units, each of which has a slot to slide said wire lines inside said loop connector without necessitating a diagonal bend of said wire and a trough for supporting said wire lines once inserted inside said loop connector, said loop connectors completely surrounding the 360° radius of said wire lines once inserted inside said loop connector.

3. A trellis system, comprising:
    a plurality of structural units each of which has a ground engaging end and a wire engaging end, said ground engaging end includes a means for resting said ground engaging end on a surface of the ground, said wire engaging end includes a means for holding two wire lines in a spaced apart configuration, each of said structural units being essentially two-dimensional in shape, wherein said structural units are assembled from two identical linear pieces, each of said two identical linear pieces including a centrally located open loop which allows said two identical pieces to be interlocked together and to be pivoted to assume an "X" shape;
    a wire positioned to pass through said means for holding two wire lines in a spaced apart configuration; and
    a means for securing said wire to the ground.

4. The trellis system of claim 1 wherein said structural units are assembled from two identical linear pieces which are held together by a hinge pin and a support bar connected to an end of each of said linear pieces at said wire engaging end of said structural units.

5. The trellis system of claim 4 wherein said support bar is used to hold said wire at said wire engaging end of said structural units.

* * * * *